United States Patent [19]

Shima et al.

[11] Patent Number: 4,823,253
[45] Date of Patent: Apr. 18, 1989

[54] CONVERSATIONAL-TYPE PROGRAMMING APPARATUS

[75] Inventors: Atsushi Shima, Koganei; Naoki Fujita, Hino; Kozo Kamada, Takatsuki, all of Japan

[73] Assignee: Fanuc Ltd, Minamitsuru, Japan

[21] Appl. No.: 83,785

[22] PCT Filed: Nov. 19, 1986

[86] PCT No.: PCT/JP86/00590
§ 371 Date: Aug. 20, 1987
§ 102(e) Date: Aug. 20, 1987

[87] PCT Pub. No.: WO87/03391
PCT Pub. Date: Jun. 4, 1987

[30] Foreign Application Priority Data

Nov. 20, 1985 [JP] Japan .................................. 60-259948

[51] Int. Cl.⁴ .......................... G06F 15/46; G06F 3/04
[52] U.S. Cl. ........................... 364/167.01; 364/474.01; 364/474.22; 364/474.26; 364/188
[58] Field of Search ............... 364/138, 146, 188, 189, 364/171, 200, 900, 191, 474.01, 474.22, 474.26, 474.32

[56] References Cited

U.S. PATENT DOCUMENTS

| | | | |
|---|---|---|---|
| 4,524,414 | 6/1985 | Kiyokawa | 364/171 |
| 4,530,046 | 7/1985 | Munekata | 364/191 |
| 4,571,670 | 2/1986 | Kishi et al. | 364/191 |
| 4,587,608 | 5/1986 | Kishi et al. | 364/171 |
| 4,607,327 | 8/1986 | Kishi et al. | 364/171 |
| 4,644,460 | 2/1987 | Kishi et al. | 364/191 |
| 4,661,899 | 4/1987 | Usuda | 364/474 |
| 4,703,441 | 10/1987 | Kishi et al. | 364/526 |
| 4,722,045 | 1/1988 | Kishi et al. | 364/171 |
| 4,723,203 | 2/1988 | Kishi et al. | 364/171 |

Primary Examiner—Michael R. Fleming
Assistant Examiner—P. Gordon
Attorney, Agent, or Firm—Staas & Halsey

[57] ABSTRACT

A conversational-type programming apparatus well suited for use when data are to be input in response to prompts on a conversational display in order to create a partial program, is provided. When a predetermined parameter item has been selected, the details of the selected item can be correctly understood, even by a person who is not skilled in NC programming language, thanks to a display of auxiliary graphics corresponding to the selected item. This enables an operator to input machining data while referring to auxiliary graphics corresponding to the parameter items, as a result of which the operator can rapidly become skilled at determining inputs.

2 Claims, 2 Drawing Sheets

CONVERSATIONAL-TYPE PROGRAMMING APPARATUS

TECHNICAL FIELD

This invention relates to a conversational-type programming apparatus used when programming the contents of a machining operation performed by a numerically controlled machine tool.

BACKGROUND ART

A variety of efficient operations can be performed with a machine tool having a multiple-axis control capability by using a numerical control unit (hereinafter referred to as an "NC unit") possessing a conversational-type automatic programming function. A conversational-type programming apparatus ordinarily has a parameter program function which enables the ready programming of similarly shaped workpieces, canned cycles, schedule operations and the like by inputting parameters. The apparatus allows one to input machining shapes merely by inputting the necessary data while observing a display screen. More specifically, conversational-type programming is characterized in that when various data are input, such as the amount of a tool correction and machining dimensions, as well as control parameters, such as machine tool backlash amount, feed rate and an acceleration/deceleration time constant, reference graphics relating to material shape, machining shape, tool shape and tool path and the like can be displayed on a display screen, thereby facilitating program creation and verification of the relevant conditions.

However, even though the graphics are displayed on a screen calling for the input of conversational data, the operator is required to have considerable skill when the machining operation is of a complicated nature. For example, after having selected a drilling menu display in a process selection step, the operator attempts to respond to prompts on the screen by inputting data corresponding to predetermined parameter items in the menu. At such time the parameters shown on a design drawing are input as data representing portions of the displayed graphic, but a beginner frequently has trouble in determining which parameters should be input as what data. This difficulty becomes even more pronounced with smaller referential graphics, more complicated graphics and when a large number of parameter items appear on the same page of the display.

As a consequence of the foregoing, a beginner is compelled to operate data setting keys such as input keys while referring not only to the display screen and design drawing but also to an operation manual. The problem is that this procedure requires a considerable amount of labor until skill is developed.

The present invention has been devised in view of the foregoing circumstances and its object is to provide a conversational programming apparatus capable of being operated in a simple manner even by an operator handling the machine for the first time.

SUMMARY OF THE INVENTION

According to the invention, there is provided a conversational-type programming apparatus having an automatic programming unit for processing NC information by conversational-type programming, and a memory for storing menu pages of the automatic programming unit as well as an auxiliary graphic corresponding to each parameter item of the menu. In addition, a graphics display unit for displaying characters, graphics and symbols, and a data input unit for inputting numerical values and graphic symbols are provided. When a predetermined parameter item is selected, the corresponding auxiliary graphic is displayed.

Thus, with the conversational-type programming apparatus of the present invention, the operator is capable of inputting machining data while referring to auxiliary graphics corresponding to each parameter item. This enables one to quickly develop skill in the input operation and reduces input errors.

BRIEF DESCRIPTION OF THE PREFERRED EMBODIMENT

The present invention will now be described in detail based on an embodiment thereof.

Figure 1:
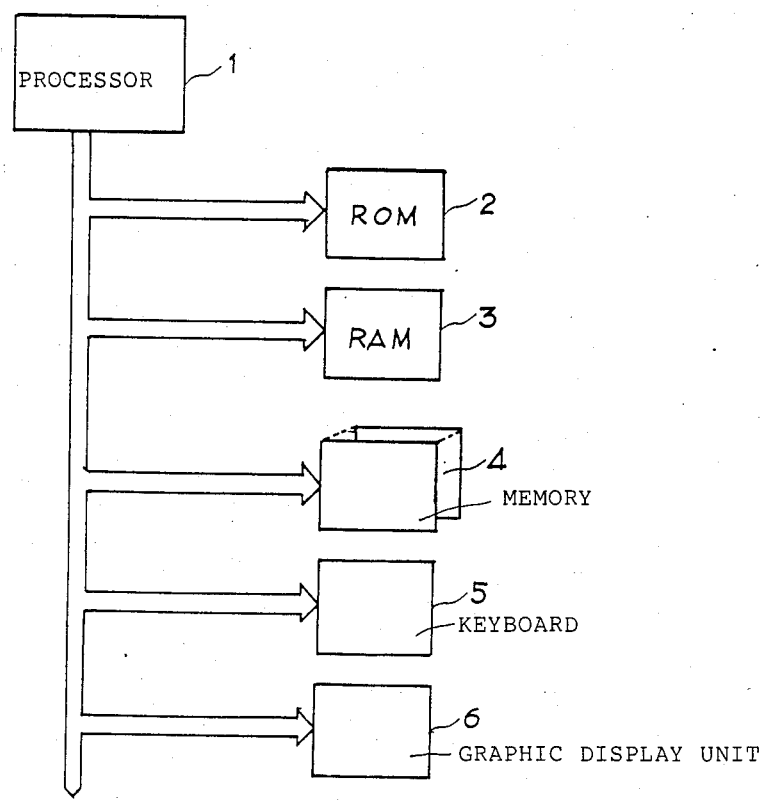
FIG. 1 is a block diagram of an embodiment according to the present invention.

FIG. 1 is a block diagram of an embodiment according to the present invention. An automatic programming unit for processing NC information comprises a microprocessor 1, a read-only memory (ROM) 2 which stores control programs for NC machining data creation and display data editing, a convertible memory (RAM) 3 for storing a creating machining program, an input/output interface, not shown, and the like. Numeral 4 denotes a memory for storing menu pages of the automatic programming unit and auxiliary graphics corresponding to each parameter item in the menu. A keyboard 5 has a plurality of keys for inputting numerical values and graphic symbols, and a shift key for selecting a detailed menu presented at the entry page of conversational-type programming, or used as a key for selecting other operations. A graphic display unit 6 for displaying characters, graphics and symbols is connected to the microprocessor 1 and displays a blinking cursor or the like at a location where a response to a prompt on the displayed menu page is to be input, and simultaneously displays an auxiliary graphic corresponding to each parameter item.

When an operator uses this conversational-type programming apparatus on site to manually input data while observing a design drawing, machining program data for an NC machine tool can be input through a simple operation. Specifically, if a shape is comparatively simple, a program can be created and edited appropriately in accordance with displays and designations made by the graphics display unit 6 on site with regard to workpieces having small lot numbers, even without the on-site operator learning NC programming language.

Figure 2:
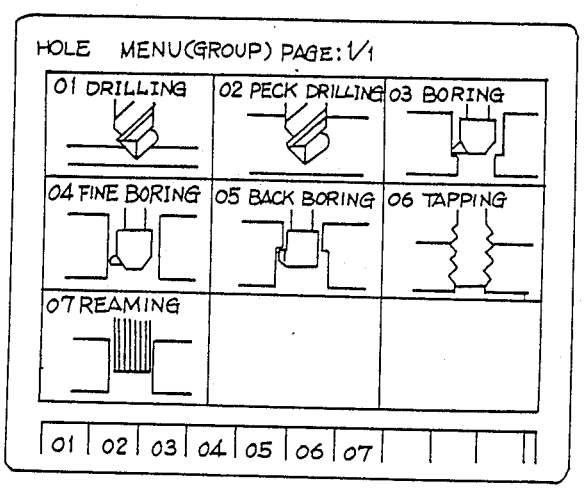
FIG. 2 an example of a menu display.
Figure 3:
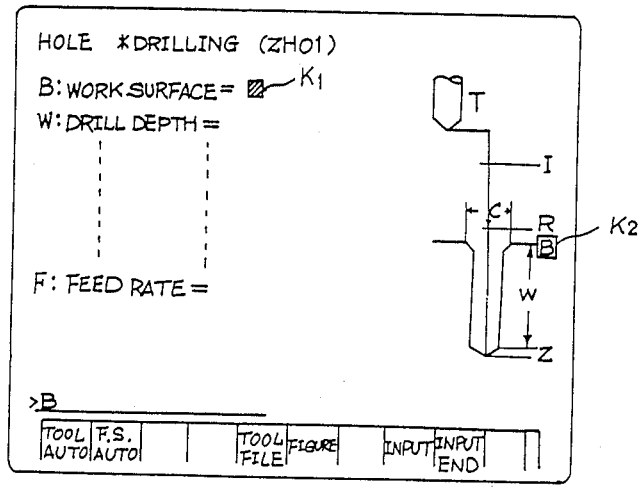
FIG. 3 is an auxiliary graphic on which a cursor is displayed.

In particular, the conversational-type programming apparatus having the construction of the abovedescribed embodiment of the invention is characterized by the following. When a menu display for drilling (i.e. a HOLE menu) of the kind shown in FIG. 2 is initially selected and a number "01" displayed on the display unit 6 along the lower edge thereof is selected by a soft key, the display changes over to a detailed menu for drilling shown in FIG. 3. At this time, an auxiliary graphic corresponding to each of various parameter items B (machining position), W (drilling depth), ... F (feed rate) and the like is displayed at the right side of the screen. Furthermore, besides a cursor K1 indicating a data input position, a second cursor K2 is provided for designating a position, which corresponds to data to be entered, on the auxiliary graphic displayed on the screen. The operator is capable of readily reading the data designated by the auxiliary graphic from the design drawing and of inputting the data as numerical data or graphic symbol data using the keyboard 5. Preferably, an exact indication should be given to the operator, such as having the cursor specifying the position on the auxiliary graphic indicate a predetermined length along the displayed line.

Other methods of displaying the auxiliary graphics can be adopted. Specifically, an arrangement can be adopted in which only portions corresponding to the respective parameter items can be graphically displayed. This will make it possible to delete the indication using the second cursor K2.

Though the gist of the invention has been described on the basis of a specific embodiment, it is obvious that various modifications and revisions can be made in the invention based on the description given hereinabove.

In accordance with the invention as described hereinabove, when data are to be input in response to a prompt on a display screen of a conversational-type programming apparatus, an auxiliary graphic corresponding to a selected parameter item can be displayed. Accordingly, the particulars of an operation can be readily understood even if a reference drawing is small in size or a drawing is complicated and a large number of parameter items appear on the same page. This makes it possible to achieve a highly efficient operation of an NC unit by preventing programming errors, even if the operator is a beginner.

We claim:

1. A conversation-type programming apparatus for performing programming by inputting the contents of a machining operation, which is to be carried out by a numerically controlled machine tool, as numerical control (NC) information on the basis of a graphic display on a screen, said apparatus comprising:
   an automatic programming unit for processing NC information by conversational-type programming, said automatic programming unit comprising:
   a memory for storing menu pages, parameter items of the menu, and auxiliary graphics corresponding to each parameter item;
   a graphics display unit, coupled to said memory, for displaying the menu, each parameter and the auxiliary graphics corresponding to each parameter, said graphics display unit indicating, using a cursor, a position corresponding to data to be entered on a display selected from the menu, and for simultaneously indicating, using two cursors, each parameter item and auxiliary graphics corresponding to data to be entered on a display selected from the menu; and
   a data input unit, coupled to said memory, for inputting numerical values and graphic symbols to said automatic programming unit.

2. An automatic programming unit for processing numerical control (NC) information, comprising the steps of:
   (a) storing control programs for NC machining data creation and display data editing;
   (b) storing a creating machining program in a convertible memory;
   (c) storing menu pages, parameter items of the menu and auxiliary graphics corresponding to each parameter item in the menu in a memory;
   (d) inputting numerical values and graphic symbols;
   (e) selecting a detailed menu;
   (f) displaying characters, graphics and symbols on a graphic display unit;
   (g) displaying a cursor at a portion of the menu page to be input; and
   (h) simultaneously indicating, using two cursors, each parameter item and auxiliary graphics corresponding to each parameter item to be entered on the display.

* * * * *